Figure 1:
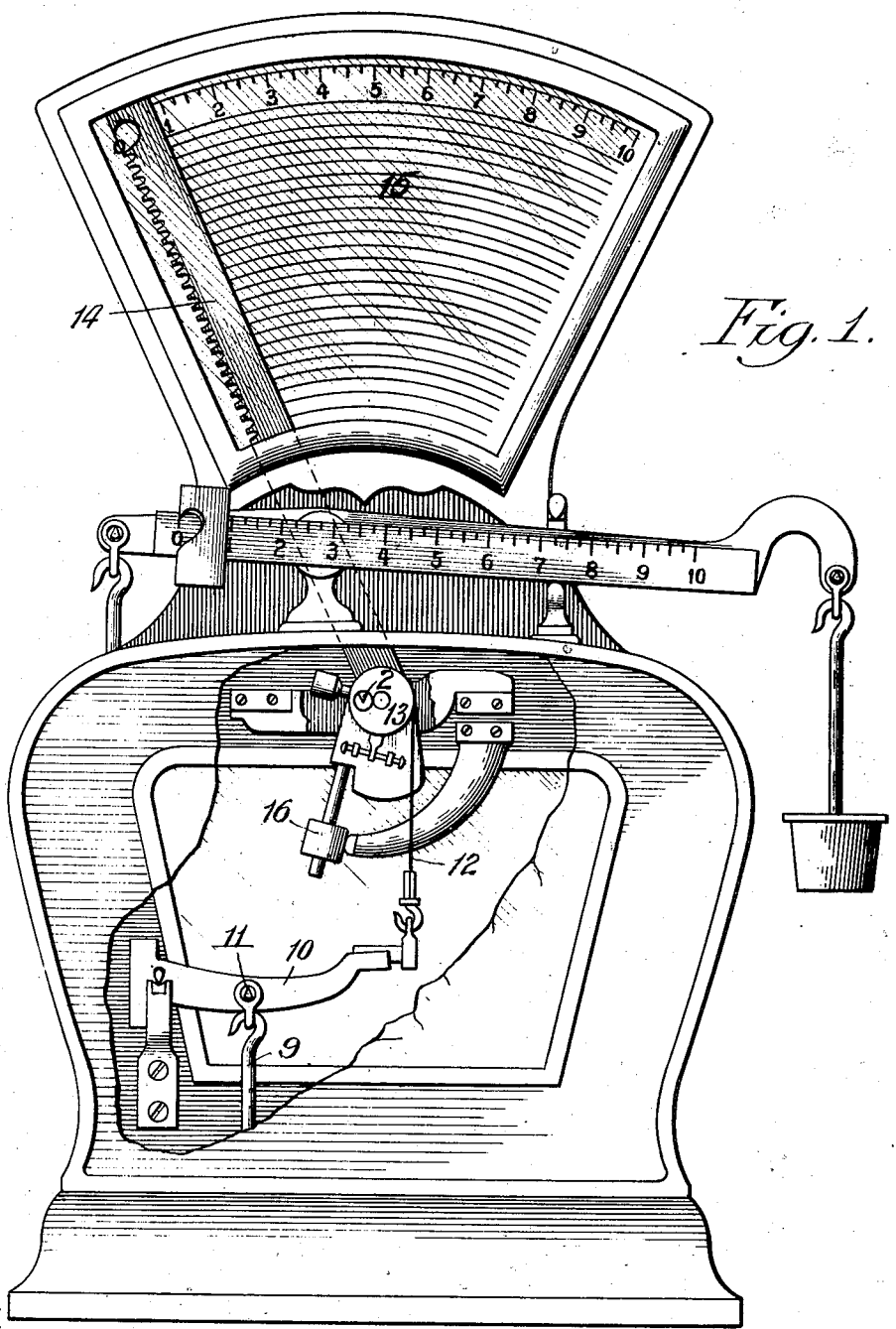

J. HOPKINSON.
KNIFE EDGE BEARING.
APPLICATION FILED JUNE 16, 1911.

1,146,794.

Patented July 20, 1915.
2 SHEETS—SHEET 1.

Witnesses:
John Enders
Henry A. Parks

Inventor:
Joseph Hopkinson,
by Sheridan, Wilkinson, Scott & Richmond,
Attys.

J. HOPKINSON.
KNIFE EDGE BEARING.
APPLICATION FILED JUNE 16, 1911.
1,146,794.
Patented July 20, 1915.
2 SHEETS—SHEET 2.
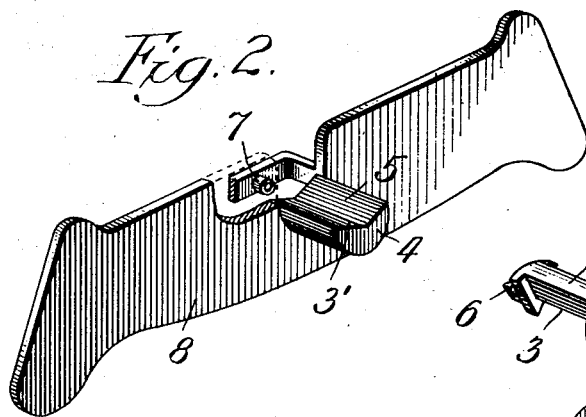
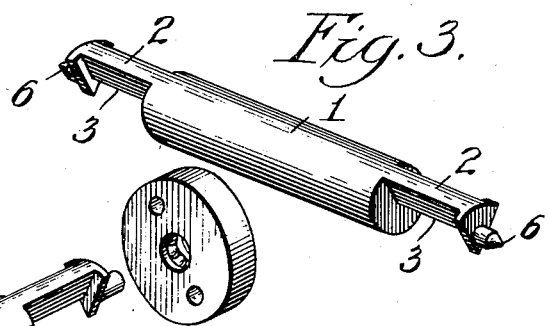
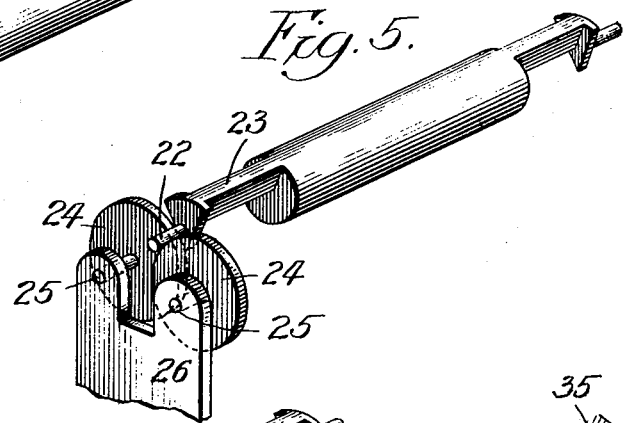
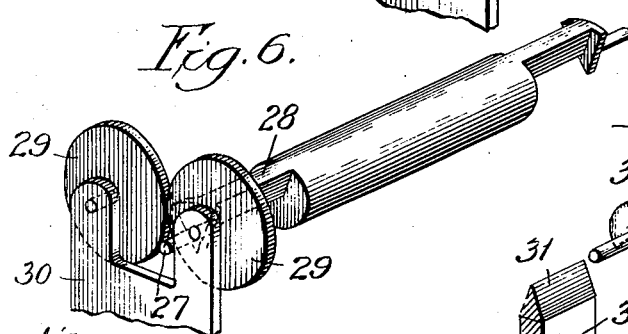
Witnesses:
John Enders
Henry A. Parks
Inventor:
Joseph Hopkinson,
by Sheridan, Wilkinson, Scott & Richmond,
Attys.

UNITED STATES PATENT OFFICE.

JOSEPH HOPKINSON, OF DAYTON, OHIO.

KNIFE-EDGE BEARING.

1,146,794.  Specification of Letters Patent.  Patented July 20, 1915.

Application filed June 16, 1911. Serial No. 633,575.

*To all whom it may concern:*

Be it known that I, JOSEPH HOPKINSON, a citizen of the United States, residing at Dayton, in the county of Montgomery and State of Ohio, have invented certain new and useful Improvements in Knife-Edge Bearings, of which the following is a specification.

The object of my invention is to provide an improved knife edge bearing for use in weighing scales and adapted for use also in any connection in which it is desired that a moving part of a mechanical structure be so mounted as to be sensitive to the application of a force of small magnitude. I will direct the description of my invention to its application to a weighing scale. In weighing scale structures it is the almost universal practice to provide the moving parts with fulcrums in the form of a knife edge coacting with a bearing, the knife edge being usually constructed of steel and the coacting bearing of some other hard substance such as agate, or hardened steel.

As a result of long experience, scale makers have found that knife edges formed to an angle of about 60 degrees resting upon bearings having a notch, the sides of which diverge at about 100 degrees, give the best results. Of course, more or less variation from these precise angles is found in practice, but the variation is limited by two conditions. If the angle of the knife edge is made too acute it will wear away rapidly, thus interfering with the sensitiveness of the scale and also altering the proper relation of the different parts. If the notch in the bearing plate upon which the knife rests is formed at too wide an angle the knife edge when rotated to a considerable extent will slip from its proper position.

In certain instances, especially in the construction of pendulum scales, it is necessary to provide for a wider range of angular movement between the knife edge and its bearing than is possible when the knife edge is constructed with the approved degree of acuteness. In order to secure a sufficient degree of relative rotation between the knife edge and its bearing however, it has heretofore been found necessary to reduce the angle of the knife edge down to abut 30 degrees, thus introducing an objectionable degree of wear. It will be obvious, of course, that the sharper or more acute the knife edge is made the more rapidly will the use of the structure wear the knife edge toward its base. In the pendulum scale this rapid wear is objectionable for the reason that it increases the length of the pendulum, thereby destroying the accuracy of the scale. In the pendulum scale, however, it is necessary to secure a degree of angular movement of the pendulum which has heretofore rendered it impossible to employ a knife edge with an angle of much over 30 degrees. The greater angular movement desired could not be secured by increasing the angle of the notch in the bearing with which the knife edge coacts, for the reason that an increase of this angle beyond the limits of the usual practice would result in the knife edge slipping out of its seat at the apex of the angle in its bearing when the knife edge is rotated to an extreme position.

The object of my invention is to construct a knife edge and bearing of such form that the knife edge may have the usual approved angle of about 60 degrees and still have a large extent of angular movement without danger of slipping from its seat in the bearing. The means whereby I accomplish this object will more clearly appear from the following description and claims, taken in connection with the accompanying drawings, in which—

Figure 1 is an elevation of a weighing scale similar to that shown in Patent No. 867,671, granted on October 8, 1907, to O. O. Ozias and J. Hopkinson, and illustrates a type of mechanism to which my invention is applicable. Fig. 2 is a perspective view of a bearing plate and guide embodying the principle of my invention. Fig. 3 is a view of an element having knife edges and guide members formed thereon and adapted for use with the bearing shown in Fig. 2. Fig. 4 is a perspective view of an element provided with knife edges, guide members and guides, varying in its specific form from the device illustrated in Figs. 2 and 3. Each of Figs. 5 and 6 is an illustration of an element provided with knife edges, guide members secured thereto, and guides coacting with said guide members. Fig. 7 shows the guide members secured to the bearing element instead of to the knife edge, said guide elements coacting with a different form of guide from that illustrated in the preceding views.

The type of scale illustrated in Fig. 1 is explained in full in the patent to O. O. Ozias and J. Hopkinson referred to above, and an extended explanation thereof is unnecessary in this application. It is sufficient to state that the article to be weighed is placed upon a platform connected by a lever or system of levers with the link 9. The downward pull imposed upon the link 9 by the article being weighed is transmitted to the lever 10 through the knife edge 11 and is transmitted from the lever 10 to the flexible band 12 which is wound about and secured to the disk 13. The pendulum 16 is rigid with the disk 13 and the knife edges 2 projecting from the disk 13 rest upon suitable bearings secured to the frame of the scale. It will be apparent that the weight of an article placed upon the scale and drawing down upon the link 9 will cause the pendulum to rotate upon its knife edges 2 in a clockwise direction and that the amount of rotation imparted to the pendulum will bear a definite relation to the weight of the article being weighed. Secured to the disk 13 is an indicating hand 14 which moves over a chart 15, the indicating hand and chart being provided with suitable designations, as explained in the patent referred to, for indicating the weight of the article being weighed and the value of different quantities thereof at different prices per unit of weight. It will be apparent that the amount of rotation imparted to the index hand 14 will correspond to the amount of rotation imparted to the pendulum 16 by the weight of the article being weighed and that the scale will arrive at equilibrium when the pendulum 16 has been rotated to such an extent that its leverage is just sufficient to counterbalance the weight of the article.

Referring now to the specific embodiments of my invention illustrated in the drawings and more particularly to the structure shown in Figs. 2 and 3, the shaft 1 is formed rigidly with the pendulum illustrated in Fig. 1, or may be taken as representative of any part of a scale structure which it is desired to provide with a knife edge bearing. At its ends the part 1 is provided with knife edges designated generally by the numeral 2. The bearing edge 3 of each of the knife edges 2 is adapted to rest in the vertex 3' of the bearing member 4. The planes 5 which define the notch in the bearing member 4 meet in a dihedral angle along the line 3', these planes forming an angle sufficiently obtuse to permit of the desired degree of rotation of the knife edge member without reducing the angle of the knife edge below the approved limit. The extent to which it is necessary to widen the notch in the bearing member 4 for this purpose is such that without the application of my invention to the structure the knife edges 2 would slip out of the vertex 3' of the notch of the bearing member 4 when the member bearing the knife edge is rotated to its extreme position in either direction.

The embodiment of my invention illustrated in Figs. 2 and 3 consists in the provision of conical bearings 6 projecting from the ends of the knife edge members 2 and the provision of conical bearing seats 7 upon a fixed part of the scale structure, as illustrated upon the frame member 8 to which the bearing 4 is secured. The cone bearings 6—7 are in alinement with the knife edge proper 3, thereby permitting the element 1 to rotate upon its knife edges without restraint. The cone bearings 6—7 impose no restraint upon oscillation of the member 1, but restrain that member against bodily movement transversely of its knife edges, thereby preventing the knife edges 2 of the member 1 from moving out of the vertex 3 of the notch in the bearing member 4. The use of the conical bearings 6—7 renders it possible to widen the angle of the notch of the bearing member 4 to the extent necessary to secure the desired degree of rotation of the pendulum in pendulum scales, and dispenses with the necessity of cutting down the angle of the knife edges 2. This renders it possible to use knife edges of the standard angle, thereby obviating rapid wear incident to the use of knife edges cut down to an acute angle of 30 degrees or thereabout.

It will be obvious upon reference to Fig. 1 that the wearing down of the knife edge 2 will have the effect of lengthening the pendulum, that is, will increase the distance between the bearing edge of the knife edge and the center of gravity of the pendulum. Such a lengthening of the pendulum results in the scale indicating a less weight than that actually placed upon the platform or scoop thereof. It will be equally obvious that the more acute the knife edge the more elongation will result from a given amount of wear thereon. From these facts the advantage of my construction, which permits the use of a knife edge of standard width, will be apparent.

In Fig. 4 I have illustrated a structure quite similar to that shown in Figs. 2 and 3, but having a ball bearing for the guide members 17 which project from the knife edges 18. This ball bearing is mounted in some fixed part of the scale, as 19, having an annular raceway 20 in which are a series of balls 21 surrounding the guide member 17. The action of this device is similar to that illustrated in Figs. 2 and 3, the axial center of the ball bearing being in alinement with the edge proper of the knife edge 18.

In Fig. 5 I have illustrated another modification in which the guide members 22 projecting from the knife edge 23 have a rolling contact with rollers 24 mounted upon trunnions 25, the trunnions 25 being journaled in a fixed part of a scale frame 26. In this instance I have shown the rollers 24 as overlapping.

In Fig. 6 another modification is shown in which the guide member 27 projecting from the knife edge 28 is received between rollers 29 rotatably mounted in the fixed frame member 30. In this instance the rollers 29 are in the same plane and have a rolling contact with the guide member 27.

Inasmuch as the function of the guide member projecting from the inner end of the knife edge is to prevent the knife edge from moving transversely of its edge, it will be apparent that a complete circular bearing may not in all instances be necessary for the guide member. It will also be obvious that the knife edge may be stationary and that the notched bearing member may be secured to the pendulum or other moving part.

In Fig. 7 I have shown a knife edge 31 mounted upon a stationary part 32 and a notched member 33 adapted to bear thereon, the knife edge and bearing member being separated to more clearly show their form. In this view I have also shown a guide member 34 coacting with a slot 35 in the stationary part 36 of the mechanism. It will be apparent that the part carrying the bearing member 33 will be restrained against movement transverse of the knife edge by engagement of the guide member 34 with the walls of the slot 35.

While I have illustrated several embodiments of my invention, it will be apparent that the principle thereof may be applied without adhering to the precise mechanical structures illustrated and described, the broad principle of my invention contemplating the use of a knife edge of the standard approved angle, that is, a knife edge not cut down to such an extent as to cause injurious wear, and the combination with such a knife edge of means for restraining it against side movement when it is inclined to its bearing.

What I claim is—

1. In a device of the class described, a bearing, a knife edge resting thereon and movable rotatively on its edge as an axis, a trunnion rigid with said knife edge and concentric therewith, and a bearing rotatively engaging said trunnion.

2. In a device of the class described, a bearing, a knife edge resting thereon and movable rotatively on its edge as an axis, a trunnion rigid with said knife edge and concentric therewith, and a roller bearing rotatively engaging said trunnion.

3. In a device of the class described, a bearing, a knife edge resting thereon and movable rotatively on its edge as an axis, a trunnion rigid with said knife edge and concentric therewith, and rollers engaging said trunnion to restrain said knife edge against bodily movement transverse of its axis.

4. In a device of the class described, a relatively fixed part and a part rotatively movable thereon, a bearing element and a knife edge element between said relatively fixed and movable parts and mounted thereon, a trunnion on one of said parts, said trunnion being concentric with said knife edge, and a bearing for said trunnion, whereby relative rotation of said parts is permitted, but relative movement thereof transverse of said knife edge is prevented.

5. In a device of the class described, a relatively fixed part and a part rotatively movable thereon, a bearing element and a knife edge element between said relatively fixed and movable parts and mounted thereon, said bearing element having two plane surfaces disposed at an angle to each other, a guide member concentric with said knife edge secured to one of said elements, and a guide engaging said guide member to prevent the element to which said guide member is secured from moving bodily in a direction transverse of the knife edge.

In testimony whereof, I have subscribed my name.

JOSEPH HOPKINSON.

Witnesses:
JAMES L. BOURNE,
CARL S. COOK.